US012661539B2

(12) United States Patent　　　　(10) Patent No.:　US 12,661,539 B2
Simon et al.　　　　　　　　　　　　(45) Date of Patent:　　Jun. 23, 2026

(54) COMPOSITE MATERIAL AND FIRE PROTECTION ELEMENT FOR SEALING PASSAGE OPENINGS AND JOINTS IN COMPONENTS

(71) Applicant: Hilti Aktiengesellschaft, Schaan (LI)

(72) Inventors: Sebastian Simon, Buchloe Lindenberg (DE); Andreas Ahlers, Westendorf (DE); Ramona Prem, Untermeitingen (DE); Ralf Willner, Tussenhausen (DE); Sarah Freudling, Augsburg (DE); Sigrid Andreae, Azmoos (CH); Claudio Wolfer, Say (CH); Michael Schreiner, Achberg (DE)

(73) Assignee: Hilti Aktiengesellschaft, Schaan (LI)

( * ) Notice: Subject to any disclaimer, the term of this patent is extended or adjusted under 35 U.S.C. 154(b) by 825 days.

(21) Appl. No.: 17/287,625

(22) PCT Filed: Oct. 23, 2019

(86) PCT No.: PCT/EP2019/078785
§ 371 (c)(1),
(2) Date: Apr. 22, 2021

(87) PCT Pub. No.: WO2020/083953
PCT Pub. Date: Apr. 30, 2020

(65) Prior Publication Data
US 2022/0111236 A1　　Apr. 14, 2022

(30) Foreign Application Priority Data
Oct. 24, 2018　(EP) ..................................... 18202290

(51) Int. Cl.
*A62C 2/06*　　　(2006.01)
*E04B 1/94*　　　(2006.01)
*F16L 5/04*　　　(2006.01)

(52) U.S. Cl.
CPC .............. *A62C 2/065* (2013.01); *E04B 1/947* (2013.01); *E04B 1/948* (2013.01); *E04B 1/941* (2013.01); *F16L 5/04* (2013.01)

(58) Field of Classification Search
CPC . E04B 1/941; E04B 1/947; F16L 5/04; A62C 2/065; A62C 3/02; A62C 3/06; A04B 1/948; A62D 1/005
(Continued)

(56) References Cited

U.S. PATENT DOCUMENTS 2,992,425 A * 7/1961 Carlton ................ H01Q 17/002
174/391
4,816,312 A * 3/1989 Annemaier ............ C09K 21/14
523/179
(Continued)

FOREIGN PATENT DOCUMENTS

EP　　　1215420 A2 * 6/2002　............. A62C 2/065
EP　　　3 489 295　5/2019
(Continued)

OTHER PUBLICATIONS

Dzulkafli, "Enhancement the Performance of the Intumescent Coating by Incorporating Talc as Flame Retardant Filler", 2011, Universiti Teknologi Petronas, pp. 16, 38, and 69 (Year: 2011).*
(Continued)

*Primary Examiner* — Kevin Edward Schwartz
(74) *Attorney, Agent, or Firm* — Grüneberg Global IP PLLC

(57) ABSTRACT
A composite material, a method for the production thereof, and a fire protection element containing the composite material can be used for the protection of passage openings in components in the event of fire, such as building parts, through which conduits are guided. The composite material
(Continued)

can also be used as a fire protection element for sealing passage openings and/or joints in components.

16 Claims, 5 Drawing Sheets

(58) Field of Classification Search
USPC .......................................... 169/45, 46; 252/2
See application file for complete search history.

(56) References Cited

U.S. PATENT DOCUMENTS

| | | | | |
|---|---|---|---|---|
| 4,945,015 | A * | 7/1990 | Milner .................... | C09K 21/00 |
| | | | | 521/149 |
| 5,607,787 | A * | 3/1997 | Wedlake .................. | A62C 3/16 |
| | | | | 429/62 |
| 6,153,674 | A * | 11/2000 | Landin ..................... | C08K 7/02 |
| | | | | 524/495 |
| 7,014,803 | B2 * | 3/2006 | Perez ................. | B32B 38/0008 |
| | | | | 264/258 |
| 8,962,115 | B2 | 2/2015 | Okabe et al. | |
| 9,097,011 | B1 * | 8/2015 | Barone ................... | B05D 7/02 |
| 10,538,616 | B2 | 1/2020 | Shimamoto et al. | |
| 2007/0232724 | A1 * | 10/2007 | Hobbs ...................... | C09C 1/64 |
| | | | | 427/213.3 |
| 2010/0173109 | A1 | 7/2010 | Okabe et al. | |
| 2013/0118764 | A1 * | 5/2013 | Porter .................... | B32B 5/022 |
| | | | | 169/48 |
| 2016/0178058 | A1 * | 6/2016 | Münzenberger .......... | F16L 5/10 |
| | | | | 277/606 |
| 2017/0253691 | A1 | 9/2017 | Shimamoto et al. | |
| 2019/0135498 | A1 * | 5/2019 | Thometschek ....... | C08L 97/007 |
| 2019/0226609 | A1 * | 7/2019 | Mantyla ................... | F16L 5/04 |
| 2021/0316177 | A1 * | 10/2021 | Ahlers ...................... | F16L 5/04 |
| 2021/0353984 | A1 * | 11/2021 | Simon .................... | E04B 1/948 |
| 2021/0394000 | A1 * | 12/2021 | Ahlers ................... | E04B 1/947 |

FOREIGN PATENT DOCUMENTS

| | | |
|---|---|---|
| JP | 8-143856 A | 6/1996 |
| JP | 2001090225 | 4/2001 |
| JP | 2002-114914 | 4/2002 |
| JP | 2008-045360 | 2/2008 |
| WO | 2009/028057 | 3/2009 |
| WO | 2016/031910 | 3/2016 |
| WO | 2018/016580 | 1/2018 |

OTHER PUBLICATIONS

Machine Translation of WO-2018016580-A1 Description, 2024, Espacenet, pp. 1-9 (Year: 2024).*
International Search Report issued Feb. 5, 2020 in PCT/EP2019/078785 with English translation, 5 pages.
Written Opinion issued Feb. 5, 2020 in PCT/EP2019/078785 with English translation, 9 pages.
U.S. Appl. No. 17/287,573, filed Apr. 22, 2021, Simon et al.
U.S. Appl. No. 17/287,597, filed Apr. 22, 2021, Ahlers et al.
U.S. Appl. No. 17/287,641, filed Apr. 22, 2021, Ahlers et al.

\* cited by examiner

COMPOSITE MATERIAL AND FIRE PROTECTION ELEMENT FOR SEALING PASSAGE OPENINGS AND JOINTS IN COMPONENTS

CROSS-REFERENCE TO RELATED APPLICATIONS

This application is the National Stage entry under § 371 of International Application No. PCT/EP2019/078785, filed on Oct. 23, 2019, and which claims the benefit of European Application No. 18202290.5, filed on Oct. 24, 2018. The content of each of these applications is hereby incorporated by reference in its entirety.

BACKGROUND OF THE INVENTION

Field of the Invention

The present invention relates to a composite material, to a method for the production thereof, and to a fire protection element containing the composite material according to the invention for the protection of passage openings and joints in components in the event of fire, such as building parts, through which conduits are guided. The present invention further relates to the use of the composite material in fire protection elements for sealing passage openings and/or joints in components.

Description of Related Art

When installing conduits, such as pipelines, electrical cables and the like, they are guided through passage openings in components, in particular building components, such as walls and ceilings. In order to prevent the passage of fire and flue gases in the event of a fire, fire protection elements are introduced between the inner walls of the passage openings and the conduits guided therethrough, and into joints. These fire protection elements are usually provided with intumescent materials or formed from these, so that the material expands under the effect of heat, as occurs in the event of a fire, and thereby presses on the conduit and closes the passage opening in the component.

As a rule, the fire protection elements have a carrier material to which additives are added for the purposes of fire protection. These additives expand or intumesce at elevated temperatures, such as in the event of a fire, and form an insulating layer in combination with the carrier material and optionally further additives, thus closing any opening that may occur.

In the known fire protection elements, a physically acting blowing agent is often used. This agent is usually randomly distributed on one or more areas of the surface of the carrier material and/or within the carrier material. Frequently, the physically acting blowing agents have a structural anisotropy, which means that they can, for example, be in the form of flakes or fibers. This structural anisotropy is not taken into account in known fire protection elements, such that the physically acting blowing agent is randomly oriented or aligned on one or more areas of the surface and/or within the carrier material. The physically acting blowing agent thus shows no preferred orientation. In this case, one also speaks of an isotropic or statistical alignment or orientation of the physically acting blowing agent on one or more areas of the surface of the carrier material and/or within the carrier material.

Due to the random orientation of the physically acting blowing agent on one or more areas of the surface or within the carrier material, an expansion or intumescence of the physically acting blowing agent takes place substantially uniformly in all three spatial directions in the event of a fire. However, in fire protection elements, which are used, for example, for sealing passage openings, an increased expansion in the direction of the passage opening to be closed is required. The expansion in all three spatial directions in known fire protection elements leads to a large part of the expanded material being pushed laterally out of the passage opening and thus only a small amount of pressure being exerted in the direction of the passage opening. In addition, the material pushed out of the passage opening is unprotected and therefore exposed to mechanical stresses, such as an extinguishing water jet, air currents caused by a fire or the like, such that the portion of the expanded material that is pushed out is not resistant in the event of a fire. Furthermore, the compression rate of the conduit guided through is reduced by the material being pushed laterally out through the passage opening such that, in the event of a fire, a short closure speed is not guaranteed.

In existing fire protection elements, attempts are made to prevent the problem of the expanded material being pushed laterally out by appropriately shaping of the housing of the fire protection element or by the use of woven fabric which surrounds the expanded material.

For instance, EP 3 260 678 A1 describes a strip-shaped fire protection element in which an inner layer of intumescent material is provided with a reinforcing material over at least part of its width, such that bending in the region of the reinforcing insert forms a fold-over edge which surrounds the reinforcing insert on the outside.

DE 2004 055 928 B4 describes a fire protection sleeve in which a transport device is provided which displaces material expanding under the effect of heat in the event of a fire from a support device towards the interior of the guide.

In another approach, the geometry of the fire protection elements is designed such that an improved heat input is achieved, as a result of which an earlier expansion of the intumescent material takes place. Corresponding fire protection elements are described in EP 1 273 841 A1 DE 10 2008 031 018 A1 and DE 20 2012 003 405 U1, for example.

Although with the known fire protection elements it is possible to reduce the lateral pushing out of the expanded material, this cannot be prevented, and therefore this still results in a loss of material, which is not available for the closure of the passage opening. In addition, the expanded material being pushed laterally out leads to transverse compression of the expanded material, thereby hindering the expansion of the physically acting blowing agent to the passage center in order to close the passage. Furthermore, in these fire protection elements, compression of the physically acting blowing agent occurs by compression at the walls or the woven-fabric areas of the fire protection element. These compressed regions have a reduced expansion potential, which is no longer available for closing the passage in the event of a fire. Furthermore, the compression causes an increase in the thermal conductivity, as a result of which there is a more rapid increase in temperature on the side facing away from the fire, which is associated with an increased risk of fire penetration.

WO2018/016580 A1 discloses a fire-resistant shaped body. The fire-resistant shaped body comprises expandable graphite embedded in a thermoplastic resin or an elastomer. The shaped body described is characterized by the alignment of the longitudinal direction of the individual expandable graphite particles with respect to the machine direction (MD), where, at 100 times magnification, the difference between the longitudinal alignment of each individual expandable graphite flake and the machine direction is a maximum of ±10°. According to the teaching of this document, the expandable graphite flakes have to be aligned in the machine direction and vertical erecting of the expandable graphite particles from the machining level is prohibited. Within the machining level, however, the expandable graphite particles may be freely rotated 360° along the longitudinal alignment thereof (longitudinal axis), whereby, in the event of fire, radially non-directional expansion takes place.

The disadvantages described above are especially relevant for fire protection elements for larger opening cross sections. In these fire protection elements, large amounts of physically acting blowing agents are used to ensure a reliable closure of the passage opening in the event of a fire. The problems described above are therefore to be observed here to a greater extent. In addition, these fire protection elements sometimes have a high weight, as a result of which their installation is difficult. Additionally, the use of large amounts of physically acting blowing agents is disadvantageous from an ecological as well as economical point of view.

SUMMARY OF THE INVENTION

There is therefore a need for a solution for reliable sealing, in particular against smoke and fire, of a gap between an inner surface of a passage opening and a conduit guided therethrough in the event of a fire, with which solution the physically acting blowing agent is pushed out of the gap to a reduced extent when said agent expands, and consequently the conduit guided through is pressed on to a greater extent.

In addition, an object of the present invention is to provide a solution for use in or as a fire protection element, which solution makes it possible to reduce the use of material, in particular the amount of physically acting blowing agent, without the performance of the fire protection element, in particular its closure ability, being compromised in the event of a fire. It is in particular an object of the present invention to provide a solution by means of which a reduction in the amount of physically acting blowing agent in the fire protection element is made possible and by means of which, at the same time, improved performance of the fire protection element, in particular improved closure ability, can be achieved in the event of a fire.

This object is achieved by a composite material and by a fire protection element, as described below.

DETAILED DESCRIPTION OF THE INVENTION

Figure 1:
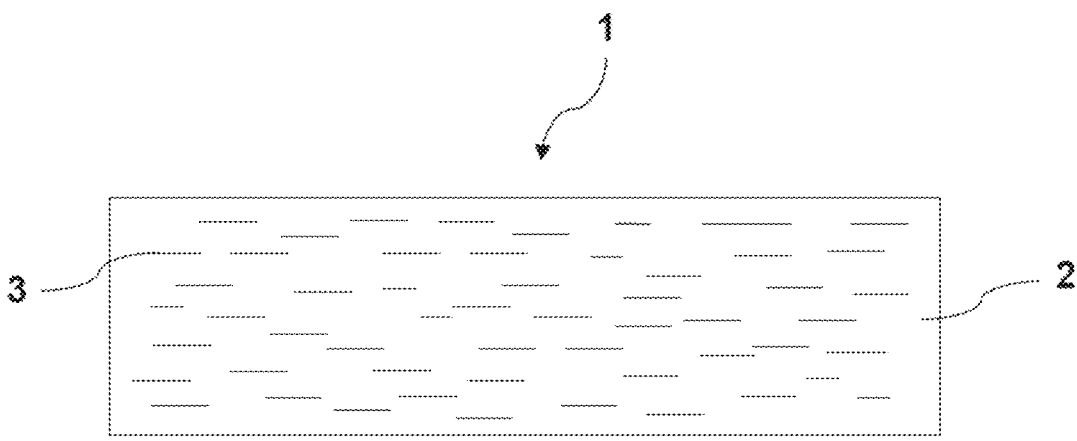
FIG. 1 shows a cross section of a preferred embodiment of a composite material according to the invention.

This object is achieved by a composite material according to claim 1 and by a fire protection element according to independent claim 14.

According to a first aspect of the invention, a composite material is provided, comprising
  i) a carrier material and
  ii) a plurality of particles of at least one layered, physically acting blowing agent,
characterized in that adjacent particles of the layered, physically acting blowing agent are arranged substantially in parallel with one another over the entire composite material:

One concept of the above-mentioned composite material is to combine a structurally anisotropic, physically intumescent material (layered, physically acting blowing agent) with a carrier material and to use the structural anisotropy of the physically intumescent material, by alignment or orientation of the particles, in order to thus influence the direction of expansion in the event of a fire and to thus be able to control this in a targeted manner. In the case of the layered, physically acting blowing agents used in the context of the present invention, expansion takes place in the event of fire substantially in one direction, specifically perpendicularly to the individual layers of which the physically acting blowing agent is formed. If adjacent particles of the layered, physically acting blowing agent are now arranged substantially in parallel with one another over the entire composite material, in the event of heat input expansion takes place substantially perpendicularly to the parallel particles and it is possible to control the expansion in a desired direction.

For a better understanding of the invention, the following explanations of the terminology used herein are considered useful. In the context of the invention:
  the term "composite material" describes a material which is obtained during production by firmly combining different materials and of which the chemical and physical properties exceed those of the individual components. In particular, in the context of the present invention, the composite material according to the invention is a fire protection element;
  the term "carrier material" describes a composition comprising one or more polymers. The carrier material is characterized in that the polymer or polymers form a continuous phase;
  the term "firmly bonded" describes a bond between two materials which results from molecular forces and holds the layers together in such a way that they form a solid body in their entirety. The separation of a firm bond is often possible only by destroying the elements that were connected to one other by a firm bond.
  the term "form-fitting" describes a connection between two materials which results from at least two connecting parts interlocking. In the context of the present invention, a form-fit connection can be produced in particular by the plastic deformability of the polymeric carrier material being used to bring about interlocking. "physical intumescence" means the formation of a voluminous, insulating layer by means of expansion of a compound that releases gases, without a chemical reaction between two compounds having taken place, thereby causing the volume of the compound to increase by a multiple of the original volume. In the context of the present invention, the term "physically acting blowing agent" means a material or a component which is capable of exhibiting physical intumescence when a certain temperature, the so-called activation temperature, is exceeded:

the term "thermal expansion" or simply "expansion" means the volume increase of a material or a component caused by physical and/or chemical intumescence;

a "polymer" is a molecule having six or more repetition units, which can have a structure that can be linear, branched, star-shaped, twisted, hyper-branched or crosslinked; polymers can have a single type of repetition unit ("homopolymers") or they can have more than one type of repetition unit ("copolymers");

the term "solids content" means the content of nonvolatile proportions of a composition. The solids content is determined according to DIN EN ISO 3251 (2008);

"contain" and "comprise" mean that further constituents may be present in addition to those mentioned. These terms are intended to be inclusive and therefore also encompass the term "consist of" "Consist of" is intended to be exclusive and means that no further constituents may be present. In a preferred embodiment, the terms "contain" and "comprise" mean the term "consist of";

a range limited by numbers, e.g. "5 to 60 wt. %," means that the two extreme values and any value within this range are disclosed individually.

According to the invention, the composite material comprises a carrier material. The carrier material preferably comprises a polymer dispersion based on water or solvent, in particular an aqueous polymer dispersion. Examples of aqueous polymer dispersions which have proven particularly useful are aqueous acrylate dispersions, aqueous dispersions or emulsions of urea resins, formaldehyde resins or melamine resins, polyvinyl acetates, polyvinyl alcohols, acrylonitrile, styrene acrylates and their copolymers.

The carrier material of the composite material according to the invention preferably comprises an aqueous acrylate (copolymer) dispersion, more preferably an aqueous dispersion of a polyalkyl (meth)acrylate and/or an alkyl (meth) acrylate copolymer. These are preferably aqueous dispersions which are obtained by polymerization, in particular by emulsion polymerization of alkyl (meth)acrylates and/or by copolymerization of alkyl (meth)acrylates with themselves and/or with copolymerizable comonomers, such as preferably (meth)acrylic acid, (meth)acrylamide, styrene, itaconic acid, acrylonitrile and/or citraconic acid, wherein the alkyl groups of the alkyl (meth)acrylates preferably have 1 to 6 C atoms, more preferably 1 to 4 C atoms. Particularly preferred according to the invention are aqueous dispersions of polybutyl acrylate, polyethylhexyl acrylate or alkyl (meth) acrylate-styrene copolymers. The acrylate (copolymer) dispersion may contain both homopolymers and copolymers or mixtures of homopolymers and/or copolymers and, preferably with a pH in the range of from 7 to 9, preferably a pH of 8, which is adjusted if necessary with dilute sodium hydroxide solution or ammonia solution, is mixed with the other constituents. This aqueous acrylate (copolymer) dispersion preferably has a solids content of from 40 to 90 wt. %, more preferably 50 to 80 wt. %, The acrylate (copolymer) dispersions preferably used according to the invention are known to a person skilled in the art and are commercially available. The curing takes place physically by drying.

It is further preferred for the carrier material to have a softening or decomposition point in the temperature range of from 80° C. to 500° C., preferably from 90° C. to 400° C., more preferably from 110° C. to 300° C. By appropriately selecting the softening or decomposition temperature of the carrier material, the expansion properties of the composite material according to the invention can be influenced. If premature softening or decomposition of the carrier material occurs in the event of a fire, this may possibly lead to a reorientation of the layered, physically acting blowing agent by deformation and/or melting of the carrier material. If the softening or decomposition temperature of the carrier material is too high, the expansion of the layered, physically acting blowing agent is hindered.

According to the invention, the composite material comprises at least one layered, physically acting blowing agent. In the context of the present invention, the term "layered" is understood to mean a material which is structurally anisotropic in the form of layers. The layered structure is due to the fact that the interactions within a layer are much more pronounced than between the Layers. In the context of the present invention, this means in particular that covalent bonds are present within the layers, with only weak interaction in the form of electrostatic and/or van der Waals forces acting between the layers.

The layered, physically acting blowing agent comprises a plurality of particles. It is essential to the present invention that adjacent particles of the layered, physically acting blowing agent are arranged substantially in parallel with one another over the entire composite material. Preferably, the particles of the layered, physically acting blowing agent are in the form of flakes, the adjacent flakes being arranged substantially in parallel with one another over the entire composite material.

It is essential to the present invention that adjacent particles of the layered, physically acting blowing agent are arranged substantially in parallel with one another over the entire composite material. In the event of a fire, the layered, physically acting blowing agent expands substantially perpendicularly to the layers from which it is constructed. A substantially parallel alignment of adjacent particles ensures that the expansion takes place substantially in one spatial direction. The substantially parallel alignment of the particles thus allows spatial control of the expansion behavior in the event of a fire. When using the composite material according to the invention as or in a fire protection element, it is thus possible to steer the expansion in a reinforced manner in the direction of the passage opening to be closed and thus to reduce or prevent lateral pushing-out out of the passage opening. The layered, physically acting blowing agent used is available to a great extent for the closure of the passage opening such that the closure ability is improved overall, which is associated with a significant reduction in the use of material with respect to the layered, physically acting blowing agent.

The term "over the entire composite material" in the context of the present invention is understood to mean that; when considering the orientation of adjacent particles of the layered, physically acting blowing agent, an overall consideration of the composite material is necessary and this parallel orientation of adjacent particles has to be present substantially for the entire volume of the composite material in order to lead to the essential effect according to the invention. A local, random parallel arrangement of adjacent particles in parts of the composite material does not lead to the effect essential to the invention of a directed expansion in the context of the invention. However, due to the fact that the orientation is considered at the level of the individual particles and their adjacent particles, it is not absolutely necessary for all of the particles of the layered, physically acting blowing agent to have a substantially parallel alignment. If, for example, there is a bending of the composite material during application, the adjacent particles of the layered, physically acting blowing agent are arranged substantially in parallel, but not all particles are arranged substantially in parallel with one another due to the bending of the composite material.

The term "substantially in parallel" in the context of the present invention is understood to mean that the adjacent particles do not have to satisfy the strictly mathematical requirements of parallel planes, but rather slight tilting of the planes is also permitted. Even with slight tilting of the planes, the above-described effect of an expansion occurring substantially in one spatial direction is still ensured. Furthermore, the term "substantially in parallel" in the context of the present invention also includes a situation whereby a small proportion of adjacent particles need not be arranged in parallel, which may be for production-related reasons, for example. Preferably, at least 75%, more preferably at least 80%, more preferably at least 85%, more preferably at least 90%, more preferably at least 95% of the adjacent particles of the layered, physically acting blowing agent show a parallel arrangement.

The substantially parallel arrangement of the adjacent particles of the layered, physically acting blowing agent over the entire composite material can be determined by visual inspection of the composite material, optionally with the aid of a microscope, by a person skilled in the art.

A quantification of any tilting that may be present can theoretically be described by a perpendicular (90°) being allowed to fall on an arbitrarily selected particle of the layered, physically acting blowing agent. Upon displacement of this perpendicular with respect to particles adjacent to this particle, there is preferably a maximum angular deviation from 90° of 25°, more preferably 15°, more preferably 10°, more preferably 5° and even more preferably 2°.

The term "adjacent particles" in the context of the present invention is understood to mean those particles which are in close proximity to a particular particle in all three spatial directions, i.e. which are arranged within a first sphere around a particle. Preferably, the term "adjacent particles" does not only mean the directly adjacent particles, but also those particles which are directly adjacent to the directly adjacent particles of a particle, i.e. particles which go beyond the first sphere and are arranged around a particle within a second sphere.

To form the composite material according to the invention, adjacent particles of the layered, physically acting blowing agent are arranged substantially in parallel with one another over the entire composite material. It follows that, within the composite material, all particles of the layered, physically acting blowing agent can be arranged substantially in parallel with one other. This constitutes a preferred embodiment of the present invention.

However, a substantially parallel alignment of all particles of the layered, physically acting blowing agent is not absolutely necessary in order to achieve the effect essential to the invention of a targeted expansion in substantially one spatial direction. This is for example the case when the composite material according to the invention is in the form of a long bandage which is wound for example around a conduit guide which passes through a passage opening. In this case, the adjacent particles of the layered, physically acting blowing agent are arranged substantially in parallel, but not all particles are arranged substantially in parallel with one another due to the winding and the associated bending of the bandage. If the adjacent particles are arranged in this case in the longitudinal direction of the bandage substantially in parallel with one another over the entire composite material, the expansion in the event of a fire takes place substantially in the direction of the center of the passage opening.

To form the composite material, the layered, physically active blowing agent can be embedded within the carrier material and/or applied to one or more areas of the surface of the carrier material. In a preferred embodiment, the layered, physically acting blowing agent is embedded within the carrier material. In an alternative preferred embodiment, the layered, physically acting blowing agent is applied to one or more areas of the surface of the carrier material. In a further preferred embodiment, the layered, physically acting blowing agent is both embedded within the carrier material and applied to one or more areas of the surface of the carrier material.

Preferably, the layered, physically acting blowing agent is distributed substantially uniformly within the carrier material.

In another preferred embodiment, the concentration of the layered, physically acting blowing agent in the carrier material may vary. The concentration of the layered, physically acting blowing agent may also be varied in a punctiform, pattern-like, planar and/or sandwich-like manner. A variable concentration has the advantage that targeted expansion can be achieved at particular points of the composite material. Furthermore, targeted heat transfer can be achieved as a result.

Depending on the application, the layered, physically acting blowing agent can be present in the composite material in a very broad weight percent range. However, it is preferred for the layered, physically acting blowing agent to be contained in the composite material in an amount of from 10 to 90 wt. %, preferably from 15 to 70 wt. %, more preferably from 20 to 55 wt. %, based on the total weight of the solids content of the composite material.

The average particle size of the layered, physically acting blowing agent can be within a broad range depending on the application. Preferably, the layered, physically acting blowing agent has an average particle size of from 50 μm to 4.0 mm, preferably from 80 μm to 3.5 mm and particularly preferably from 100 μm to 3.0 mm. The average particle size can be determined by the methods known to a person skilled in the art, for example by means of sieving analysis according to DIN 66165 (2016).

The layered, physically acting blowing agent is preferably selected from the group consisting of graphite intercalation compounds (also known as expandable graphite) phyllosilicate intercalation compounds and combinations thereof, with graphite intercalation compounds or expandable vermiculite being preferred.

Known intercalation compounds of $SO_x$, $NO_x$, halogen, acetic acid, nitric acid and/or strong acids in graphite can be considered as examples of graphite intercalation compounds. These are also referred to as graphite salts. Graphite intercalation compounds that give off $SO_2$, $SO_3$, $NO$ and/or $NO_2$ while expanding at temperatures (activation temperatures) of from 120 to 350° C., for example, are preferred. Expandable graphites suitable for the present invention are commercially available.

Preferably, the graphite intercalation compounds have an average particle size of from 50 μm to 1.0 mm, preferably from 70 μm to 0.7 mm and particularly preferably from 90 μm to 0.5 mm.

Suitable phyllosilicate intercalation compounds (expandable phyllosilicates) are, for example, those compounds which can be obtained by incorporation of intercalation compounds into native, expandable phyllosilicates, in particular native vermiculite. Representatives of the alcoholates of lithium and potassium and salts of lithium, sodium and potassium with organic acids and/or aqueous solutions thereof, which are incorporated into the native phyllosilicate by cation exchange, are preferred as the intercalation compound. In this regard, reference is made to DE 1029083 A1 and the literature cited therein, e.g. EP 0 429 246 A1 the contents of which are hereby incorporated into this application.

The phyllosilicate intercalation compounds preferably have an average particle size of from 100 μm to 4.0 mm, preferably from 120 μm to 3.5 mm and particularly preferably from 150 μm to 3.0 mm.

The carrier material may further comprise at least one organic and/or inorganic fiber. These are preferably selected from the group consisting of glass fiber, ceramic fiber, carbon fiber, polyimide fiber, metal fiber, boron fiber, natural fiber, rock fiber and mixtures thereof. The presence of an organic and/or inorganic fiber in the carrier material facilitates the incorporation and orientation of the layered, physically acting blowing agent into the carrier material, Particularly suitable fibers are glass fibers and/or metal fibers, in particular consisting of E-glass, silicate fibers or mineral wool fibers.

The organic or inorganic fibers preferably have a length of from 1 mm to 25 mm, more preferably from 2 mm to 20 mm, and particularly preferably from 3 mm to 15 mm. By way of example, glass fibers from STW may be mentioned here.

The organic or inorganic fibers are preferably contained in the carrier material in an amount of from 0.1 to 25.0 wt. %, preferably from 0.5 to 15.0 wt. %, particularly preferably from 1.0 to 6.0 wt. % based on the total weight of the solids content of the composite material.

It is particularly preferred for the longitudinal extent of the organic and/or inorganic fiber to be substantially parallel to the particles of the layered, physically acting blowing agent. In this case, the organic and/or inorganic fibers support the effect of the expansion being targeted in one spatial direction in the event of a fire.

Because the ash crust formed in the event of a fire may be too unstable and, depending on its density and structure, may therefore be blown away by air streams, which has a negative effect on the sealing effect of the fire protection element, the carrier material may additionally contain at least one ash crust stabilizer.

An "ash crust stabilize" is a so-called skeleton-forming compound which stabilizes the carbon skeleton (ash crust) formed from the physically acting blowing agent and the carrier material. In this connection, the fundamental mode of action is that the inherently very soft carbon layers being formed are mechanically strengthened by inorganic compounds. The addition of such an ash crust stabilizer contributes to significant stabilization of the intumescence crust in the event of a fire, because these additives increase the mechanical strength of the intumescent layer and/or prevent it from falling off, as a result of which the insulating effect is maintained or enhanced.

The compounds commonly used in fire protection formulations and known to a person skilled in the art, for example particulate metals, such as aluminum, magnesium, iron and zinc, may be considered as ash crust stabilizers or skeleton-forming substances. The particulate metal can be present in the form of a powder, flakes, scales, fibers, threads and/or whiskers, the particulate metal in the form of powder, flakes or scales having a particle size of ≤50 μm, preferably of from 0.5 to 10 μm. If the particulate metal is used in the form of fibers, threads and/or whiskers, a thickness of from 0.5 to 10 μm and a length of from 10 to 50 μm are preferred. Alternatively or additionally, an oxide or a compound of a metal of the group comprising aluminum, magnesium, iron or zinc may be used as the ash crust stabilizer, in particular iron oxide, preferably iron trioxide, titanium dioxide, and/or a borate such as zinc borate. Examples of such additives are also found in U.S. Pat. Nos. 4,442,157 A, 3,562,197 A, GB 755 551 A, as well as EP 138 546 A1.

Preferably, the ash crust stabilizer is a phosphorus-containing compound selected from salts and derivatives of the oxoacids of phosphorus. The oxoacids of phosphorus are used because their range is very large. The oxoacids of phosphorus are phosphoric acid ($H_3PO_4$) (also referred to as orthophosphoric acid), diphosphoric acid ($H_4P_2O_7$) (also referred to as pyrophosphoric acid), triphosphoric acid ($H_5P_3O_{10}$), polyphosphoric acid ($H_{n+2}P_nO_{3n+1}$), polymetaphosphoric acid (($HPO_3$)$_n$), hypophosphoric acid ($H_4P_2O_6$) (also diphosphoric (IV) acid), diphosphoric (III, V) acid ($H_4P_2O_6$), phosphoric acid ($H_3PO_2(2)$), where the number in the parenthesis designates the maximum base of the acid, if this is different from the total number of H atoms in the formula, (also referred to as phosphorous acid), diphosphonic acid ($H_4P_2O_5(2)$), where the number in the parenthesis designates the maximum base of the acid, if this is different from the total number of H atoms in the formula (also referred to as diphosphorous acid), phosphinic acid ($H_3PO_2$ (1)), wherein the number in the parenthesis designates the maximum base of the acid, if this is different from the total number of H atoms in the formula.

The following may be mentioned by way of example as phosphoric acid compounds: monoammonium phosphate, diammonium phosphate, ammonium phosphate, ammonium polyphosphate, melamine phosphate, melamine resin phosphates, potassium phosphate, polyol phosphates such as, for example, pentaerythritol phosphate, glycerol phosphate, sorbitol phosphate, mannitol phosphate, dulcitol phosphate, neopentyl glycol phosphate, ethylene glycol phosphate, dipentaerythritol phosphate and the like. Preferably, a polyphosphate or an ammonium polyphosphate is used as a phosphoric acid compound. In this regard, melamine resin phosphates are understood to be compounds such as the reaction products of Lamelite C (melamine-formaldehyde resin) with phosphoric acid.

The ash crust stabilizer is preferably contained in the carrier material in an amount of approximately 5 to 35 wt. %, preferably 7 to 30 wt. %, particularly preferably 10 to 28 wt. %, based on the total weight of the solids content of the composite material.

In addition, other fire protection additives, in particular those which cause chemical intumescence, and those which act ablatively, may be contained in the composition. "Chemical intumescence" means the formation of a voluminous, insulating ash layer by means of compounds which are coordinated with one another and which react with one another under the effect of heat. These are generally a carbon source, an acid former and a gas former.

A "carbon source" is an organic compound which, due to incomplete combustion, leaves behind a carbon skeleton and is combusted incompletely to form carbon dioxide and water (carbonization). These compounds are also known as "carbon-skeleton-forming substances." An "acid former" is a compound which, under the effect of heat, i.e. above approximately 150° C., forms a non-volatile acid, for example due to decomposition, and thereby acts as a catalyst for carbonization. In addition, it can contribute to lowering the viscosity of the melt of the carrier material. The term "dehydrogenation catalyst" is used synonymously here. A "gas former" is a compound which decomposes at an elevated temperature with the development of inert, i.e. non-combustible, gases and expands the carbon skeleton formed by the carbonization and optionally the softened binder into a foam (intumescence).

Optionally, the carrier material may contain other conventional additives, such as plasticizers, fillers, pigments, additives for adjusting the rheological properties, thickeners, dispersants, emulsifiers, biocides, fungicides, preservatives and anti-aging agents, antifreeze agents, wetting agents, defoamers and/or skin-formation retardants. These other additives are commercially available products known to a person skilled in the art.

Fillers which can be used are the fillers commonly used and known to a person skilled in the art. The following can be mentioned by way of example as fillers: chalk, barium sulfate, quartz, talc, kaolin, calcium sulfate and/or calcium silicate. The filler may be used alone or as a mixture of two or more.

As pigments, the carrier material may preferably contain iron oxide, titanium dioxide, zinc sulfide, zinc oxide and/or organic or inorganic color pigments.

The carrier material may for example contain highly dispersed silica, bentonites or modified bentonites, polyacrylates and/or cellulose derivatives, such as celluose ethers, as additives for adjusting the rheological properties.

The additives may be contained in the carrier material in an amount of from approximately 0.25 to 2.5 wt. %, preferably 0.5 to 1.7 wt. %, particularly preferably 0.8 to 1.6 wt. %, based on the sum of the solids content of the composite material.

According to a preferred embodiment, the composite material according to the invention is a moldable mass or as a molded part, in particular in the form of strips, rings or plates.

The composite material preferably has a maximum average layer thickness of ≤10 mm, more preferably ≤8 mm, and particularly preferably ≤5 mm. In a preferred embodiment, the composite material has an average layer thickness of from 0.5 mm to 4.6 mm.

Description of the Drawings

Embodiments will be explained in more detail with reference to the accompanying drawings.

Figure 2:
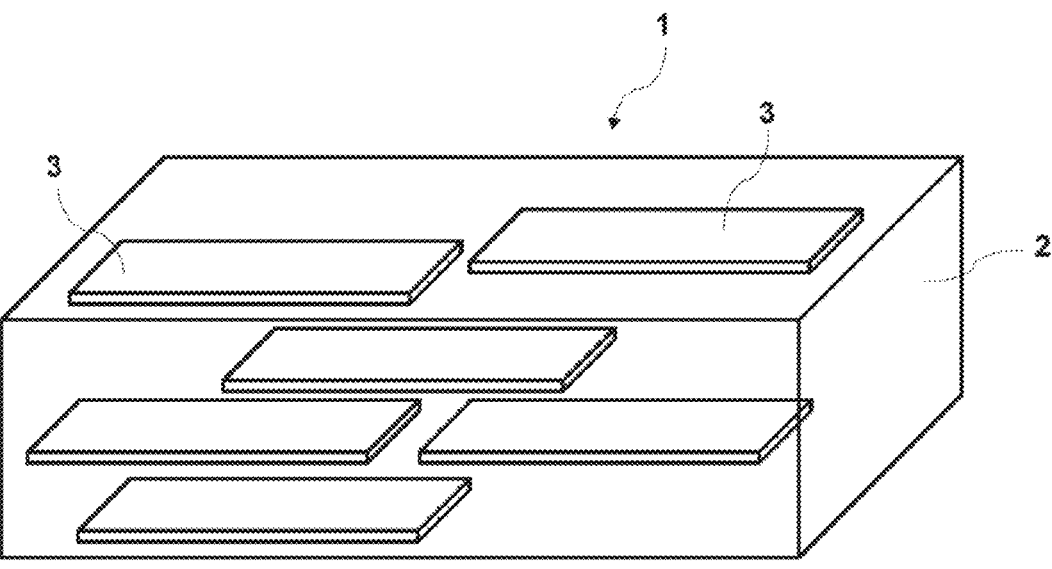
FIG. 2 shows a schematic view of a composite material that is preferred according to the invention.
Figure 3A:
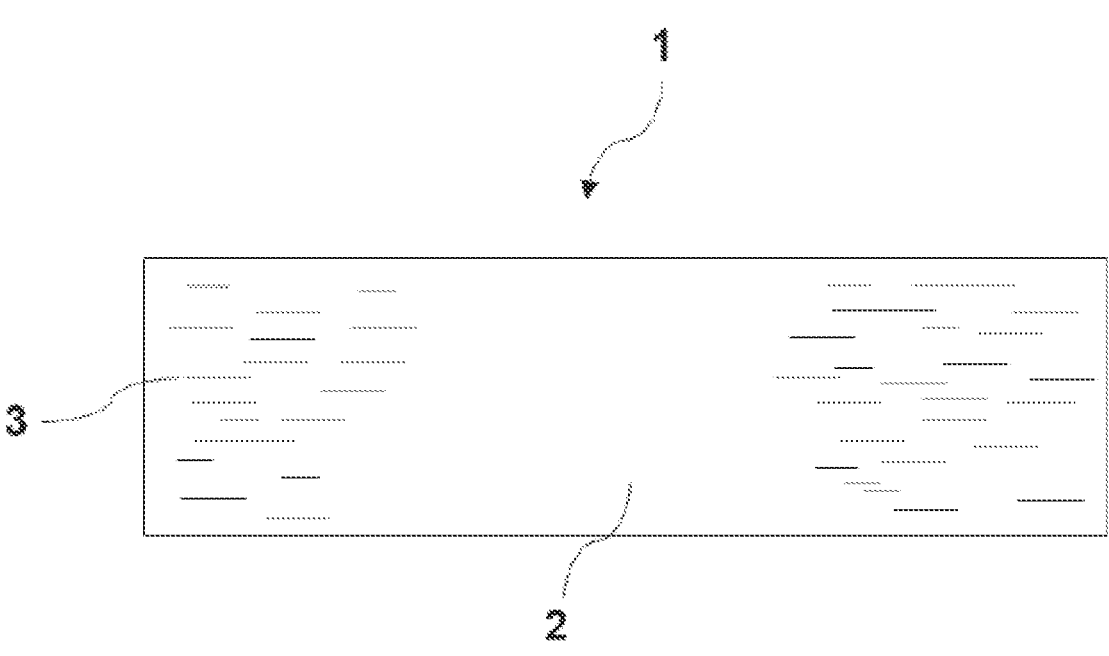
FIG. 3A shows a first cross section view of an alternative embodiment of a composite material according to the invention.
Figure 3B:
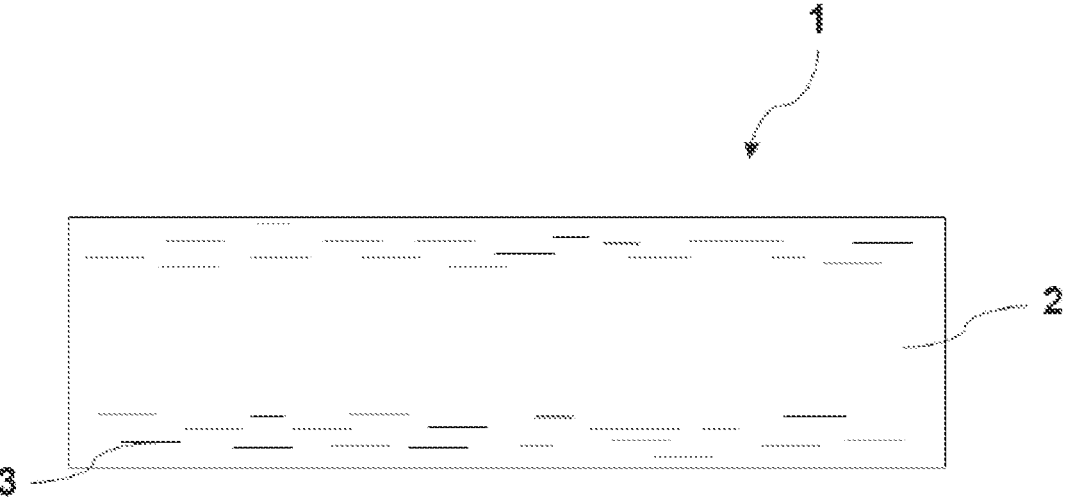
FIG. 3B shows a second cross section view of an alternative embodiment of a composite material according to the invention.
Figure 4:
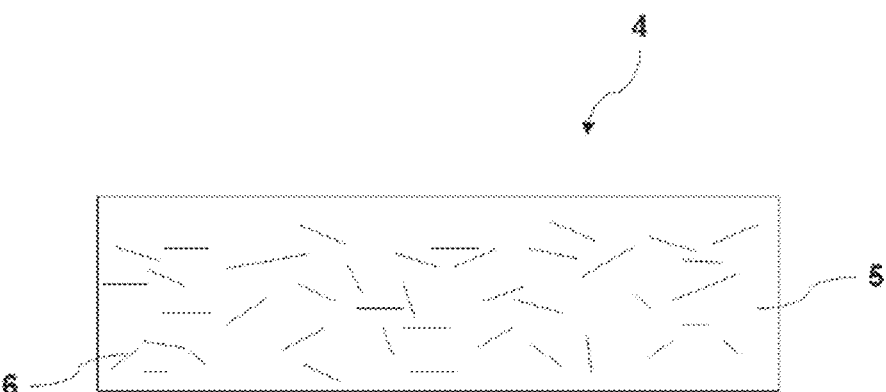
FIG. 4 shows a cross section of a fire protection element known from the prior art.
Figure 5:
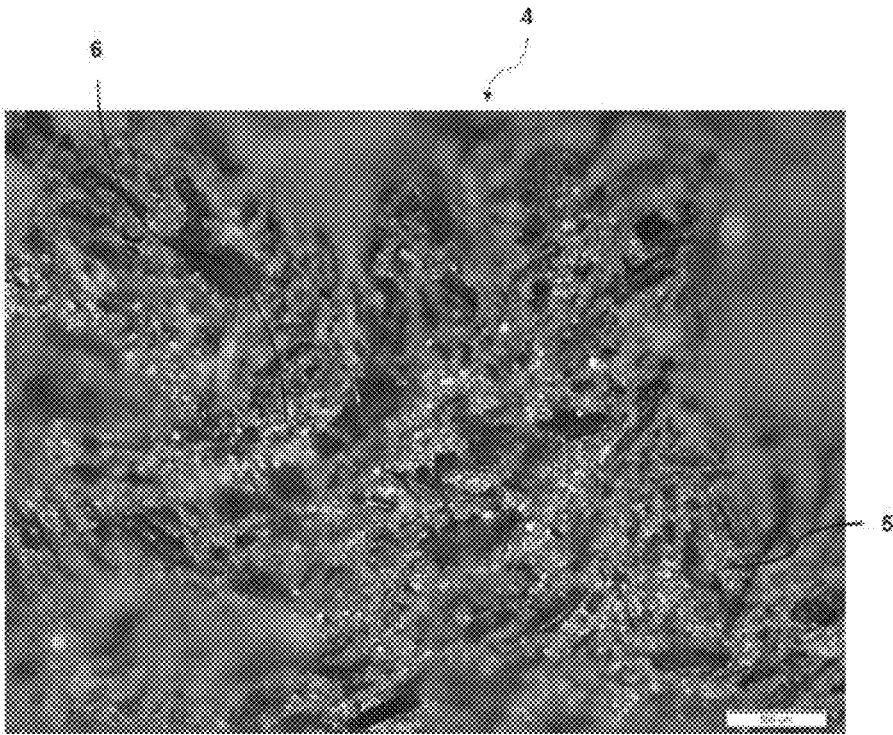
FIG. 5 shows a photograph of a fire protection element known from the prior art with expandable graphite embedded in a polymeric carrier material.
Figure 6:
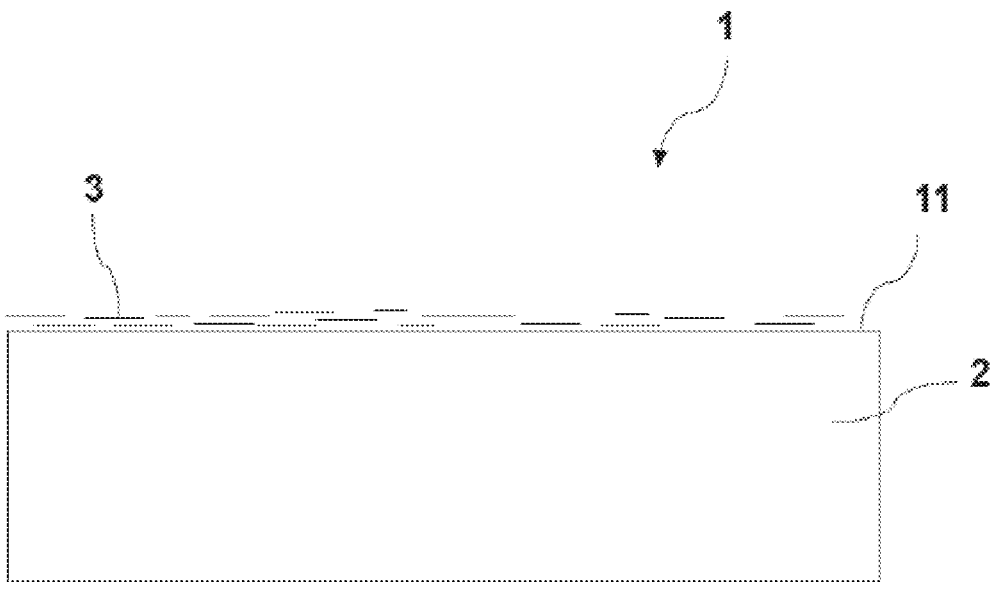
FIG. 6 shows a cross section of a further embodiment of a composite material according to the invention.
Figure 7:
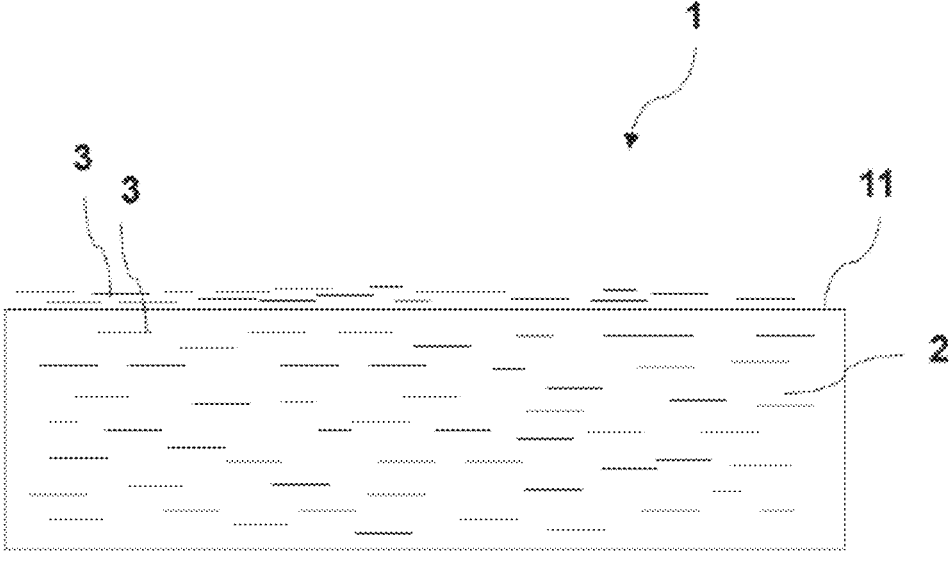
FIG. 7 shows a cross section of an embodiment of a composite material according to the invention.
Figure 8:
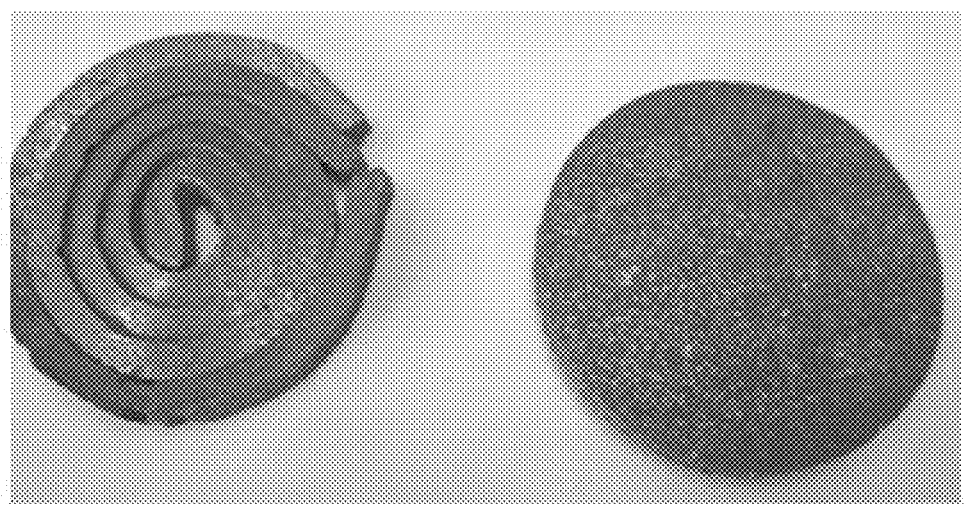
FIG. 8 shows a photograph of a test setup.
Figure 9:
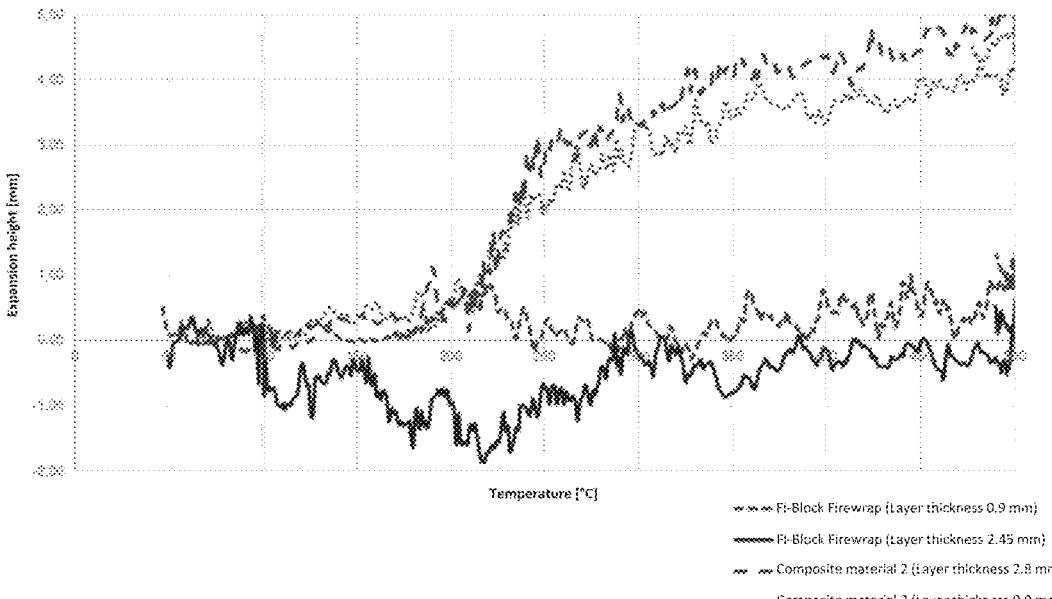
FIG. 9 shows a graphical evaluation of a comparison of expansion attempts of a composite material according to the invention with fire protection elements known from the prior art.

FIG. 1 is a cross section of a preferred embodiment of a composite material according to the invention;

FIG. 2 is a schematic view of a composite material that is preferred according to the invention;

FIGS. 3A and 3B show two cross-sectional views of an alternative embodiment of a composite material according to the invention;

FIG. 4 is a cross section of a fire protection element known from the prior art;

FIG. 5 is a photograph of a fire protection element known from the prior art with expandable graphite embedded in a polymeric carrier material;

FIG. 6 is a cross section of a further embodiment of a composite material according to the invention;

FIG. 7 is a cross section of an embodiment of a composite material according to the invention;

FIG. 8 is a photograph of a test setup;

FIG. 9 shows a graphical evaluation of a comparison of expansion attempts of a composite material according to the invention with fire protection elements known from the prior art.

FIG. 1 is a cross section of an embodiment of a composite material (1) according to the invention. The composite material (1) comprises a carrier material (2) and at least one layered, physically acting blowing agent (3). Adjacent particles of the layered, physically acting blowing agent (3) are arranged substantially in parallel with one another. The layered, physically acting blowing agent (3) is embedded within the carrier material (2) and is distributed substantially uniformly within the carrier material (2).

FIG. 2 is a three-dimensional view of a composite material (1) that is preferred according to the invention. The particles of the layered, physical blowing agent (3) are shown in the form of flat cuboids. Adjacent particles of the layered, physical blowing agent (3) are arranged in parallel with one another over the entire composite material (1). FIG. 2 shows a preferred embodiment in which all the adjacent particles of the layered, physical blowing agent (3) are arranged in parallel with one another over the entire composite material (1).

FIGS. 3A and 3B show alternative embodiments of a composite material (1) according to the invention. The composite material (1) comprises a carrier material (2) and at least one layered, physically acting blowing agent (3), mutually adjacent particles of the layered, physically acting blowing agent (3) being arranged substantially in parallel with one another. The layered, physically acting blowing agent (3) is embedded within the carrier material (2) and the concentration of the layered, physically acting blowing agent (3) within the carrier material is varied. FIG. 3A shows a concentration of the layered, physically acting blowing agent (3) that is varied in a pattern-like, planar manner. FIG. 3B shows a concentration of the layered, physically acting blowing agent (3) that is varied in a sandwich-like manner.

FIG. 4 is a cross section of a fire protection element (4) known from the prior art, which comprises a carrier material (5) and a layered, physically acting blowing agent (6). The physically acting blowing agent (6) is randomly oriented or aligned within the carrier material (5), i.e. there is a statistical alignment or orientation of the physically acting blowing agent (6) within the carrier material.

FIG. 5 is a photograph of a microscopic analysis (25 times magnification) of a composite material known from the prior art which is used as an intumescent inlay in a fire protection sleeve (Hilti, CP644 fire protection sleeve, layer thickness of the composite material 4.5 mm). The inlay was produced by means of extrusion using a standard die and comprises a plurality of expandable graphite particles embedded in a polymeric carrier material. The microscopic analysis shows that the individual expandable graphite particles are aligned in the machine direction. A view of the entire inlay shows an isotropic and random alignment of the individual expandable graphite particles along the machining plane, in which adjacent expandable graphite particles can be arranged in parallel with one another at individual local points. The photograph shows that there is no substantially parallel orientation of adjacent expandable graphite parts over the entire inlay.

FIG. 6 is a cross section of a further alternative embodiment of a composite material (1) that is preferred according to the invention. The composite material (1) comprises a carrier material (2) and at least one layered, physically acting blowing agent (3). The layered, physically acting blowing agent (3) is applied to an area (11) of the surface of the carrier material (2). Adjacent particles of the layered, physically acting blowing agent (3) are arranged substantially in parallel with one another.

FIG. 7 is a cross section of a further alternative embodiment of a composite material (1) that is preferred according to the invention. The composite material (1) comprises a carrier material (2) and at least one layered, physically acting blowing agent (3). The layered, physically acting blowing agent (3) is both embedded within the carrier material (2) and applied to an area (11) of the surface of the carrier material (2). Adjacent particles of the layered, physically acting blowing agent (3) that is embedded and applied on the surface are arranged substantially in parallel with one another, FIG. 8 is a photograph of a test setup by means of which the substantially parallel arrangement of adjacent particles of the layered, physically acting blowing agent over the entire composite material can be established.

FIG. 9 shows the graphical evaluation of the expansion attempts of a composite material according to the invention in comparison to fire protection elements known from the prior art.

The invention is not limited to the embodiments shown. In particular, individual features of one embodiment can be contained independently of the other features of the corresponding embodiment in a further embodiment according to the invention, i.e. the features described can be combined with one another as desired.

According to a second aspect of the present invention, a method for producing the composite material according to the invention is provided. The method according to the invention comprises the following steps:

i) providing a carrier material, ii) providing a layered, physically acting blowing agent, iii) combining the carrier material and the layered, physically acting blowing agent to produce a precursor, iv) optionally mixing the carrier material and the layered, physically acting blowing agent to produce a precursor, characterized in that adjacent particles of the layered, physically acting blowing agent are arranged substantially in parallel with one another over the entire composite material by the action of a force.

The substantially parallel arrangement of adjacent particles of the layered, physically acting blowing agent over the entire composite material by the action of a force can take place in step ii), i.e. adjacent particles of the layered, physically acting blowing agent are already arranged substantially in parallel with one another before connection to the carrier material takes place in step (iii).

Alternatively, the substantially parallel arrangement of adjacent particles of the layered, physically acting blowing agent over the entire composite material may take place by the action of a force during and/or following steps iii) and/or iv). In this case, adjacent particles of the layered, physically acting blowing agent are arranged substantially parallel only after the carrier material and the layered, physically acting blowing agent have been interconnected. However, it is also possible for the action of a force to occur both in step ii) and during and/or following steps iii) and/or iv).

Preferably, the force acting on the layered, physically acting blowing agent is selected from the group consisting of one or more mechanical forces, one or more electrical forces, one or more electromagnetic forces, and combinations thereof. In principle, any application of a force which makes it possible to implement a substantially parallel arrangement of adjacent particles of the layered, physically acting blowing agent over the entire composite material is considered. By way of example, this can be achieved by coating, brushing, spraying, squeegeeing, sedimentation, filtration, centrifuging, shaking, ultrasound, vibration and/or the application of current and/or magnetism. It is preferred for a substantially parallel alignment of the adjacent particles of the layered, physically acting blowing agent over the entire composite material to be carried out by extrusion with shaped mouthpieces in specific geometries and/or by means of a calender (rollers).

The composite material according to the invention is suitable for use as a fire protection element or for being integrated into a fire protection element. Therefore, according to a third aspect of the present invention, a fire protection element is provided which comprises the composite material according to the invention.

The fire protection element according to the invention can be configured in all forms that geometrically allow the use as a fire protection element. In a preferred embodiment, the fire protection element is strip-shaped and is in the form of an endless bandage.

The fire protection element according to the invention may comprise one or more composite materials according to the invention. If the fire protection element comprises more than one composite material, it is advantageous, if two or more composite materials are layered, to arrange a functional layer between the composite materials, it being further advantageous for the layers of the composite material and the functional layer to be interconnected in a substantially firm and/or form-fitting manner. The functional layer preferably extends continuously between the two or more composite materials. Preferably, the functional layer comprises at least one semi-rigid material or the functional layer preferably consists of at least one semi-rigid material. In the context of the present invention, the term "semi-rigid material" is understood to mean a material which has both sufficient mechanical strength to be able to absorb the inflation pressure emanating from the composite material without being completely or partially torn and sufficient flexibility such that the expansion of the layered, physically acting blowing agent is not hindered. It has proven advantageous for the semi-rigid material to be selected from the group consisting of expanded metal, glass fibers, aluminum foil and combinations thereof.

The present invention further relates to the use of a composite material according to the invention as a fire protection element for sealing passage openings and/or joints in components.

The present invention further relates to the use of a layered, physically acting blowing agent in a fire protection element, adjacent particles of the layered structure, physically acting blowing agent being arranged substantially in parallel with one another over the entire fire protection element for improving the performance of the fire protection element, in particular for increasing the closure ability of the fire protection element when the same or a reduced amount of layered, physically acting blowing agent is used.

The invention is further illustrated by the following examples.

EXAMPLES

A formulation was prepared with the constituents listed in Table 1 below, and the indicated constituents were mixed together. The formulation prepared comprises a carrier material as well as a layered, physically acting blowing agent and can be used as a starting material for the production of the composite materials according to the invention.

TABLE 1

| Constituents formulation for the preparation of composite material according to the invention [wt. %] | |
| --- | --- |
| | 1 |
| Aqueous acrylate dispersion (65% acrylate and 35% water) | 38.1 |
| Expandable graphite (Kaisersberg) | 26.5 |
| Short-cut glass fibers (diameter ~10 μm, length 6 mm) | 4.4 |
| Ammonium polyphosphate | 18.3 |
| Melamine polyphosphate | 5.3 |
| Dipentaerythritol | 7.4 |

To produce a composite material according to the invention, a defined amount of the above formulation was applied to a PE film having a smooth surface and the starting material was then covered on both sides by wrapping the PE film. The starting material covered with PE film (layer thickness 10 mm) was calendered (distance between the rollers in the calender between 0.5 mm and 10.0 mm). The distance between the rollers of the calender was reduced in steps of 1 mm and the aforementioned steps were repeated until the mass had the desired layer thickness. To smooth the surface, the last processing step was carried out twice with the calender. Alternatively, this step was performed by applying pressure via a roller. The composite materials thus produced exhibit a substantially parallel alignment of adjacent particles of the layered, physically acting blowing agent over the entire carrier material, which was determined by means of visual inspection under a microscope.

Furthermore, a composite material according to the invention (composite material 2) was produced according to the above description, where the starting material of the product CP 648-E from Hilti was used as a formulation. This formulation comprises a carrier material (aqueous acrylate dispersion) and a layered, physically acting blowing agent.

To determine the expansion properties of the composite materials produced, these materials were first dried in a drying oven (approximately 60° C.) and then a device for function replacement testing was used to determine the amount of expansion (upward direction of expansion). For comparison, the so-called expansion factor can be determined from these measurements, which represents the quotient of the expansion height of the composite material with respect to the total weight of the composite material. The measuring device for performing the function replacement test consisted of two horizontally arranged heatable plates. The top plate had a constant weight. Composite materials to be measured (circular with a diameter of 45 mm) were arranged between the heatable plates and subjected to a temperature program (starting temperature 50° C., heating rate 20° C./min, intermediate temperature 100° C. (5 min), heating rate 20° C., final temperature 500° C. (15 min hold time). The top plate was able to record expansion in height.

In order to show a substantially parallel alignment of adjacent particles of the layered, physically acting blowing agent over the entire composite material, the following test setup was selected, 4.5 mm thick strips were cut from the relevant composite material and these strips were rolled up as shown in FIG. 6. A strip was rolled up (Example 2) such that the expansion takes place in the x-direction (=height) and a strip was rotated by 90° (Example 1) such that the expansion takes place in a planar direction.

Example 1: rolled sample by 90°, assumption: predominantly planar expansion;

Example 2: rolled sample, assumption; expansion predominantly in height;

Example 3; punched-out reference sample, 45 mm diameter,

In addition to the expansion height, the total surface area of the expanded samples was determined by software with reference to photographs.

TABLE 2

| Expansion heights and total surface areas of composite materials 1 and 2, slight deviations from the theoretical expansion behavior can be attributed to the sample preparation. | | | | | |
| --- | --- | --- | --- | --- | --- |
| Composite material | | Mass [g] | Sample thickness [mm] | Expansion height [mm] | Total surface area [cm$^2$] |
| 1 | Ex. 1 | 5.55 | 5.0 | 7.12 | 137 |
| | Ex. 2 | 5.77 | 5.0 | 11.70 | 89 |
| | Ex. 3 | 5.76 | 5.0 | 17.31 | 71 |
| 2 | Ex. 1 | 9.40 | 4.5 | 7.88 | 186 |
| | Ex. 2 | 9.44 | 4.5 | 14.93 | 120 |
| | Ex. 3 | 9.30 | 4.5 | 15.71 | 126 |

It was found that all samples according to Example 1 had only a low expansion height, but demonstrated a large increase in the total surface area. The samples of composite materials 1 and 2 according to Examples 2 and 3 have expanded significantly more in height in comparison, whereas the total surface area remained significantly smaller.

Furthermore, the expansion characteristics of the composite material 2 of the present invention were examined, using the above-described device for functional replacement testing, in comparison with the expansion characteristics of the commercially available product Fi-Block-Firewrap (available in 2 thicknesses: 0.9 mm and 2.45 mm) from Sekisui, Japan. This product is based on a polymeric carrier material in which expandable graphite is embedded. To determine the expansion properties of the is commercially available Fi-Block Firewrap, circular samples weighing 1.60 g (0.9 mm thickness) and 6.33 g (2.45 mm thickness) were punched out. These samples were placed in the device for functional replacement testing, the temperature program was started and the upward expansion was measured. The results in comparison with the results of the expansion of the composite material 2 according to the invention are shown in FIG. 9. It has been shown that the samples that are not according to the invention exhibit a substantially lower expansion height than the composite materials according to the invention. Furthermore, the occurrence of a negative expansion height in the samples that are not according to the invention can be explained by a melting of the polymeric carrier material which takes place before the expansion of the expandable graphite takes place.

The invention claimed is:

1. A composite material, comprising:

i) a carrier material, and ii) a plurality of particles of at least one layered, physically acting blowing agent, wherein adjacent particles of the at least one layered, physically acting blowing agent are arranged substantially in parallel with one another over the entire composite material, and at least 75% of adjacent particles of said at least one layered, physically acting blowing agent show a parallel arrangement, wherein the carrier material comprises a polymer dispersion based on water or solvent and has a softening or decomposition point in a range of from 80° C. to 500° C.; and wherein the carrier material has a solids content of 40-65 wt. % and/or a water or solvent content of 35-60 wt. %.

2. The composite material according to claim 1, wherein the at least one layered, physically acting blowing agent is embedded into the carrier material.

3. The composite material according to claim 2, wherein the at least one layered, physically acting blowing agent is evenly distributed within the carrier material.

4. The composite material according to claim 2, wherein a concentration of the at least one layered, physically acting blowing agent within the carrier material may be varied in a manner of spots, patterns, areas, and/or sandwiches.

5. The composite material according to claim 1, wherein the at least one layered, physically acting blowing agent is applied to one or more areas of a surface of the carrier material.

6. The composite material according to claim 1, wherein the at least one layered, physically acting blowing agent is contained in the composite material in an amount of from 10 wt. % to 90 wt. %, based on a total weight of a solids content of the composite material.

7. The composite material according to claim 1, wherein the at least one layered, physically acting blowing agent has an average particle size of 50 μm to 4 mm.

8. The composite material according to claim 1, wherein the at least one layered, physically acting blowing agent is selected from a group consisting of graphite intercalation compounds, phyllosilicate intercalation compounds, and mixtures thereof.

9. The composite material according to claim 1, wherein the carrier material comprises at least one organic and/or inorganic fiber.

10. The composite material according to claim 1, wherein the composite material has a maximum layer thickness of ≤10 mm.

11. The composite material according to claim 1, wherein the composite material is formed as a moldable mass or as a molded part.

12. A fire protection element, comprising at least one composite material according to claim 1.

13. A method for sealing passage openings and/or joints in structural elements with a fire protection element, the method comprising:

expanding the fire protection element in the passage openings and/or joints in structural elements, wherein the fire protection element comprises the composite material according to claim 1.

14. The composite material according to claim 1, wherein at least 80% of adjacent particles of said at least one layered, physically acting blowing agent show a parallel arrangement.

15. The composite material according to claim 1, wherein at least 95% of adjacent particles of said at least one layered, physically acting blowing agent show a parallel arrangement.

16. The composite material according to claim 1, wherein said plurality of particles are arranged substantially in parallel, influencing a direction of expansion in a fire.

* * * * *